United States Patent
Chakrapani et al.

(10) Patent No.: US 6,900,923 B2
(45) Date of Patent: May 31, 2005

(54) SILOXANE MATRIX POLYMERS AND SPD LIGHT VALVE FILMS INCORPORATING SAME

(75) Inventors: Srinivasan Chakrapani, Commack, NY (US); Steven M. Slovak, Massapequa, NY (US)

(73) Assignee: Research Frontiers Incorporated, Woodbury, NY (US)

( * ) Notice: Subject to any disclaimer, the term of this patent is extended or adjusted under 35 U.S.C. 154(b) by 7 days.

(21) Appl. No.: 10/465,489

(22) Filed: Jun. 18, 2003

(65) Prior Publication Data

US 2004/0257634 A1 Dec. 23, 2004

(51) Int. Cl.[7] .......................... G02B 26/00; G02F 1/03; C09K 19/00; H01B 3/20; C08K 0/00
(52) U.S. Cl. ...................... 359/296; 359/253; 428/1.31; 428/1.5; 252/573; 522/71
(58) Field of Search ................................ 359/296, 253, 359/452; 345/105, 107, 108; 356/441; 525/176; 428/1.31, 1.5, 448; 606/192; 252/572, 582, 583, 585; 522/71, 99, 148, 172

(56) References Cited

U.S. PATENT DOCUMENTS

| | | | |
|---|---|---|---|
| 4,247,175 A | 1/1981 | Saxe | 350/362 |
| 4,407,565 A | 10/1983 | Saxe | 350/374 |
| 4,772,103 A | 9/1988 | Saxe | 350/362 |
| 5,409,734 A | 4/1995 | Lee et al. | 427/163.1 |
| 5,461,506 A | 10/1995 | Check, III et al. | 359/296 |
| 5,463,491 A | 10/1995 | Check, III | 359/296 |
| 5,463,492 A | 10/1995 | Check, III | 359/296 |
| 6,416,827 B1 * | 7/2002 | Chakrapani et al. | 428/1.31 |
| 6,663,646 B1 * | 12/2003 | Shah | 606/192 |

* cited by examiner

Primary Examiner—Loha Ben
Assistant Examiner—Jack Dinh
(74) Attorney, Agent, or Firm—Ostrolenk, Faber, Gerb & Soffen, LLP

(57) ABSTRACT

A film suitable for use as a light-modulating unit of a suspended particle device (SPD) light valve. The film comprises a siloxane matrix polymer which has a refractive index>1.4630 and has droplets of a liquid light valve suspension distributed within the matrix. The liquid light valve suspension preferably comprises a polyalkyl (meth)acrylate and/or fluorinated (meth)acrylate suspending polymer and optionally may comprise one or more non-polymeric liquids.

22 Claims, No Drawings

SILOXANE MATRIX POLYMERS AND SPD LIGHT VALVE FILMS INCORPORATING SAME

FIELD OF THE INVENTION

The present invention is directed to improved films for use in suspended particle devices such as light valves. More particularly, the invention relates to improved films formed with siloxane matrix polymers having a refractive index greater than 1.4630 and to light valves incorporating the improved films of the invention.

BACKGROUND

Light valves have been known for more than sixty years for modulation of light. They have been proposed for use in numerous applications during that time including, e.g., alphanumeric displays and television displays, filters for lamps, cameras, optical fibers and displays, and windows, sunroofs, sunvisors, eyeglasses, goggles, mirrors and the like to control the amount of light passing therethrough or reflected therefrom as the case may be. Examples of windows, without limitation, include architectural windows for commercial buildings, greenhouses and residences, windows for automotive vehicles, boats, trains, planes and spacecraft, windows for doors including peepholes, and windows for appliances such as ovens and refrigerators including compartments thereof. Light valves of the type described herein are also known as "suspended particle devices" or "SPDs".

As used herein, the term "light valve" describes a cell formed of two walls that are spaced apart by a small distance, with at least one wall being transparent. The walls have electrodes thereon, usually in the form of transparent, electrically conductive coatings. The cell contains a light-modulating element (sometimes herein referred to as an "activatable material"), which may be either a liquid suspension of particles or a plastic film in which droplets of a liquid suspension of particles are distributed.

The liquid suspension (sometimes herein referred to as "a liquid light valve suspension" or as "a light valve suspension") comprises small particles suspended in a liquid suspending medium. In the absence of an applied electrical field, the particles in the liquid suspension assume random positions due to Brownian movement. Hence, a beam of light passing into the cell is reflected, transmitted or absorbed depending upon the cell structure, the nature and concentration of the particles and the energy content of the light. The light valve is thus relatively dark in the OFF state. However, when an electric field is applied through the liquid light valve suspension in the light valve, the particles become aligned and for many suspensions most of the light can pass through the cell. The light valve is thus relatively transparent in the ON state.

For many applications it is preferable for the activatable material, i.e., the light modulating element, to be a plastic film rather than a liquid suspension. For example, in a light valve used as a variable light transmission window, a plastic film in which droplets of liquid suspension are distributed is preferable to a liquid suspension alone because hydrostatic pressure effects, e.g., bulging associated with a high column of liquid suspension, can be avoided through use of a film and the risk of possible leakage can also be avoided. Another advantage of using a plastic film is that, in a plastic film, the particles are generally present only within very small droplets and, hence, do not noticeably agglomerate when the film is repeatedly activated with a voltage.

A "light valve film" as used herein refers to a film having droplets of a liquid suspension of particles distributed in the film or in a portion of the film.

U.S. Pat. No. 5,409,734 exemplifies a type of light valve film that is made by phase separation from a homogeneous solution. Light valve films made by cross-linking emulsions are also known. See U.S. Pat. Nos. 5,463,491 and 5,463,492 both of which are assigned to the assignee of the present invention.

The following is a brief, non-limiting description of liquid light valve suspensions as known in the prior art.

A variety of liquid light valve suspensions are well-known in the art and such suspensions are readily formulated according to techniques well-known to one of ordinary skill therein. The term "liquid light valve suspension", as noted above, when used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

Liquid light valve suspensions useful in the present invention may include any of the so-called "prior art" liquid suspending media previously proposed for use in light valves for suspending the particles. Liquid suspending media known in the art which are useful herein include, but are not limited to, the liquid suspending media disclosed in U.S. Pat. Nos. 4,247,175, 4,407,565, 4,772,103, 5,409,734, 5,461,506 and 5,463,492. In particular, as described herein suspensions formed with the use of suspending media comprising polyalkyl (meth)acrylate and/or fluorinated (meth) acrylate suspending polymers are preferred for use in the present invention. In general one or both of the suspending medium or the polymeric stabilizer typically dissolved therein is chosen so as to maintain the suspended particles in gravitational equilibrium.

The polymeric stabilizer, when employed, can be a single type of solid polymer that bonds to the surface of the particles, but which also dissolves in the non-aqueous liquid (s) which comprise the liquid suspending medium. Alternatively, there may be two or more solid polymeric stabilizers serving as a polymeric stabilizer system. For example, the particles can be coated with a first type of solid polymeric stabilizer such as nitrocellulose which, in effect, provides a plain surface coating for the particles, together with one or more additional types of solid polymeric stabilizer that bond to or associate with the first type of solid polymeric stabilizer and which also dissolve in the liquid suspending medium to provide dispersion and steric protection for the particles. Also, liquid polymeric stabilizers may be used to advantage, especially in SPD light valve films, as described for example in U.S. Pat. No. 5,463,492.

Inorganic and organic particles may be used in a light valve suspension, and such particles may be either light-absorbing or light-reflecting in the visible portion of the electromagnetic spectrum.

Conventional SPD light valves have generally employed particles of colloidal size. As used herein the term "colloidal" means that the particles generally have a largest dimension averaging about 1 micron or less. Preferably, most polyhalide or non-polyhalide types of particles used or intended for use in an SPD light valve suspension will have a largest dimension which averages 0.3 micron or less and more preferably averages less than one-half of the wavelength of blue light, i.e., less than 2000 Angstroms to keep light scatter extremely low.

Notwithstanding the advantages which accrue due to the use of SPD films comprising a 1.455–1.463 refractive index (RI) siloxane matrix polymer as described in U.S. Pat. No. 6,416,827 B1 ("the '827 patent") assigned to the assignee of the present invention, such films nonetheless remain subject to certain deficiencies. One particular area of concern with regard to such films is their performance capabilities in a wide variety of weather conditions (i.e., referred to herein as the film's "weatherability"). In particular, light valve films produced, according to the '827 patent, incorporating siloxane matrix polymers and polyalkyl (meth)acrylate and/or fluoroalkyl (meth)acrylate suspending polymers have been known to exhibit color changes, loss in light transmittance range and an increase in the off-state light transmission of the film upon prolonged exposure to accelerated weathering conditions applied to such films using an Atlas Ci 4000 Weather-Ometer (Atlas Electric Devices Company, Chicago, Ill.). Although not wishing to be bound by any particular theory, the inventors of the present invention have hypothesized that the phenyl content of the matrix polymer used in forming such films is insufficient in affording reasonable ultraviolet (UV) protection to the polyiodide crystals within the liquid light valve suspension, which crystals are inherently unstable to UV exposure under the conditions encountered in the Weather-Ometer, thus giving rise to the color change, loss of light transmittance range and an increase in off-state transmission as described above. It is known that phenyl groups strongly absorb in the ultraviolet region. It has therefore been determined that increasing the phenyl content of the matrix polymer, and thereby raising its refractive index ("RI"), as taught herein, will prevent the above-mentioned problems and lead to better performance by films produced therewith upon being subjected to a variety of weathering conditions.

SUMMARY OF THE INVENTION

It is therefore an object of the present invention to provide an improved film for use as a light-modulating element of an SPD light valve. The film is formed by cross-linking a siloxane matrix polymer having an elevated percentage of phenyl groups (i.e., in comparison to the relative percentage of such groups found in the films disclosed in the '827 patent) such that the presence of such elevated levels of phenyl groups in the subject polymer results in the formation of a siloxane matrix polymer having a refractive index greater than 1.4630.

The present invention thus provides an improved film for use as a light-modulating unit of a suspended particle device ("SPD") light valve. The film comprises a siloxane matrix polymer having an increased (i.e., in comparison to the prior art) phenyl content, such that the refractive index of the matrix polymer is greater than 1.4630 having droplets of a liquid light valve suspension distributed within the matrix, wherein the liquid light valve suspending medium comprises a polyalkyl (meth)acrylate and/or fluorinated (meth) acrylate suspending polymer.

In another embodiment, the liquid light valve suspending medium for use with a light valve according to the invention may include, in addition to at least one polyalkyl(meth) acrylate and/or fluorinated (meth)acrylate suspending polymer as described herein, one or more "prior art" non-polymeric liquid suspending media such as, but not limited to, those described in any of U.S. Pat. Nos. 4,247,175, 4,407,565, 4,772,103, 5,409,734, 5,461,506 and 5,463,492.

In another embodiment, the invention additionally provides a film as described above suitable for use as a light-modulating unit of a suspended particle device light valve, wherein the film comprises a matrix polymer material having a refractive index greater than 1.4630 which is cross-linked in forming the film to produce a cross-linked polymer matrix. The film has droplets of a liquid light valve suspension distributed within the cross-linked matrix, which suspension may be comprised of a polyalkyl (meth)acrylate and/or fluorinated (meth)acrylate suspending polymer and optionally includes one or more of the prior art non-polymeric liquid suspending media as described above.

The invention further provides a light valve comprising a pair of opposed spaced-apart cell walls and a light modulating element between the cell walls, wherein the light modulating element comprises a film produced according to the invention as described herein.

The invention additionally provides an electro-optical device adapted for controlling the transmission of radiation. The device comprises a cell formed of opposed cell walls, a light-modulating element located between the cell walls and opposed electrode means operatively associated with the cell walls. The light modulating element comprises a film comprised of a matrix polymer material (of RI>1.4630) and having droplets of a liquid light valve suspension distributed within the polymer matrix. The electrode means is adapted for applying an electrical field across the suspension.

The invention further provides a method of preparing a film suitable for use as a light modulating unit of a suspended particle device light valve. The method entails preparing a quantity of a matrix polymer (of >1.4630 RI) and forming an emulsion from the combination of at least a portion of the matrix polymer material and a quantity of a liquid light valve suspension. The suspension comprises a plurality of particles suspended in a liquid light valve suspending medium, wherein the liquid light valve suspending media comprises a polyalkyl (meth) acrylate and/or fluorinated (meth)acrylate-based suspending polymer.

The method of the invention may additionally comprise cross-linking the polymer matrix to solidify the matrix polymer and produce a film having droplets of the liquid light valve suspension distributed in the cross-linked polymer matrix.

DETAILED DESCRIPTION OF THE INVENTION

It has been determined that the inclusion in suspended particle devices of films formed with a siloxane-based matrix polymer, i.e., defined herein as a matrix polymer comprising a plurality of siloxane groups, having a RI>1.4630 provides light valves having improved weatherability characteristics as well as other improved performance parameters such as increased emulsion stability in comparison to the prior art. The above-described matrix polymer can be used to form an emulsion by combining the polymer with any non-polymeric liquids and/or suspending polymers having a refractive index within 0.005 of the refractive index of the matrix polymer, with which the matrix polymer is immiscible, which emulsion may then be further processed to form a liquid light valve film.

The invention thus comprises, in a first embodiment, a film suitable for use as a light-modulating unit of a suspended particle device (SPD) light valve. The film comprises a siloxane-based matrix polymer material having droplets of a liquid light valve suspension distributed within the matrix, wherein the matrix polymer has an RI>1.4630.

In a second embodiment the polymer matrix used in forming the film of the invention comprises a siloxane-based polymer matrix which is substantially immiscible with the liquid light valve suspension distributed therein. The siloxane polymer matrix has a refractive index ("RI") value greater than 1.4630. Preferably, the refractive index of the siloxane polymer falls within a range of from about 1.4700 to about 1.4750. Most preferably, the siloxane matrix polymer has a refractive index of 1.4717. This most preferred refractive index is close to that of the most preferred liquid suspending polymer, which is a poly(lauryl methacrylate-Co-HEMA) polymer.

In an alternate embodiment, the liquid light valve suspension may additionally include, i.e., in addition to one or more polyalkyl (meth)acrylate and/or fluorinated (meth) acrylate-based suspending polymers, at least one "prior art" non-polymeric liquid suspending medium known to those of ordinary skill in this art.

In a further embodiment, the matrix polymer material is cross-linked in forming the film to produce a cross-linked polymer matrix.

The matrix polymers mentioned above can be readily cured with the use of ultraviolet radiation, electron beam irradiation or heat. In a further embodiment, the matrix polymer material or emulsion may further comprise one or more photoinitiators to facilitate curing of the film by ultraviolet radiation. These photoinitiators are preferably selected from the group consisting of alphahydroxyketones and their blends, alphaaminoketones, benzyldimethyl-ketals, acylphosphine oxides and their blends, metallocenes, benzoyl formate esters, benzoin ethers, benzophenones and mixtures thereof. If curing by heat is used, the matrix polymer or emulsion may comprise one or more catalysts.

In a further embodiment, the invention is directed to a light valve comprising a pair of opposed, spaced-apart cell walls with a light-modulating element between the cell walls, wherein the light-modulating element may comprise any of the films prepared in accordance with the invention, as described herein.

In another embodiment, the invention is directed to an electro-optical device for controlling the transmission of radiation, wherein the device comprises a cell formed of opposed cell walls, a light modulating element between the cell walls and opposed electrode means operatively associated with the cell walls. The light modulating element comprises a film, which film comprises a siloxane-based matrix polymer of RI>1.4630 having droplets of a liquid light valve suspension distributed within the matrix. The electrode means is adapted for applying an electrical field across the suspension. The liquid light valve suspension comprises a polyalkyl (meth)acrylate and or fluorinated suspending polymer.

Optionally, as described above, the suspension may additionally comprise, i.e., in addition to the at least one polyalkyl (meth)acrylate and/or fluorinated (meth)acrylate suspending polymer, at least one "prior art" non-polymeric liquid suspending medium.

In a further embodiment of the electro-optical device as described above, the matrix polymer material is cross-linked in forming the film to produce a cross-linked matrix polymer.

The invention is further directed, in another embodiment, to a method of preparing a film suitable for use as a light-modulating unit of a suspended particle device light valve. The method includes preparing a quantity of a siloxane-based matrix polymer material of >1.4630 R.I. The method further comprises forming an emulsion from the combination of at least a portion of the above-described matrix polymer material and a quantity of a liquid light-valve suspension comprising a plurality of particles suspended in a liquid light valve suspending medium, wherein the liquid light valve suspending medium comprises a polyalkyl (meth)acrylate and/or fluorinated suspending polymer. If desired, as discussed above, the suspension may additionally include one or more known, i.e., prior art non-polymeric liquid suspending media.

A further step of the method of the invention may involve cross-linking the polymer matrix to solidify the matrix polymer and produce a film having droplets of the liquid light valve suspension distributed in the cross-linked polymer matrix.

In a further embodiment, the polymer matrix is cross-linked by exposing the above emulsion to a sufficient amount of radiation or heat for a sufficient duration to at least substantially convert the emulsion to a film. In one embodiment the radiation used to cross-link the matrix polymer is electron beam radiation. In another embodiment, the radiation used is ultraviolet radiation. In a particular embodiment the polymer matrix is cross-linked by exposure to ultraviolet radiation and a photoinitiator is added to the emulsion to facilitate the cross-linking. In a preferred embodiment, the photoinitiator is selected from the group consisting of alphahydroxyketones and their blends, alphaamino-ketones, benzldimethyl-ketals, acylphosphine oxides and their blends, metalocenes, benzoylformate esters, benzoin ethers, benzophenones and mixtures thereof.

In still another embodiment, heat is used to cross-link the matrix polymer using free radical initiators that are known to those skilled in this art.

All of the patents and other references cited herein are incorporated into this application by reference thereto to the degree necessary to completely understand the invention.

EXAMPLES

The following examples are provided only for the purpose of illustrating the invention, and are not to be construed as limiting the invention in any manner. All parts and percentages are by weight unless otherwise noted.

Example 1

Synthesis of Matrix Siloxane Copolymer of 1.4717 Refractive Index

Into a 1 L reaction kettle was weighed 90 g of (previously distilled and purified) disilanol terminated dimethyl (82–86%)diphenyl(14–18%)siloxane copolymer (sometimes herein referred to as "copodisilanol"), 10 g of 3-acryloxypropylmethyl dimethoxy silane and 400 mL of heptane. The reaction kettle was fitted with two Dean-Stark ("D-S") traps and through the third port a mechanical agitation device was introduced. The fourth port on the kettle lid was covered with a septum for drawing out aliquots for monitoring the progress of the reaction. The contents of the reaction kettle were brought to reflux and allowed to reflux for 90 minutes without catalyst addition. Some condensation took place, as evidenced by the collection of water in the D-S traps. The catalyst, i.e., tin(II) 2-ethylhexanoate, (0.03 g) in 10 mL of heptane, was introduced through a syringe into the kettle through the septum. Condensation reaction between the siloxane monomers was allowed to continue for the next 105 minutes and 60 mL of trimethylmethoxy silane was introduced into the reaction kettle at this point. This endcapping reaction was allowed to proceed for 120 minutes, after which the reaction kettle was allowed to cool rapidly.

450 mL of ethanol was placed in a 2 L beaker and the lukewarm reaction mixture was added to the beaker and stirred. The beaker was washed with 50 mL of heptane and the washings were also transferred to the beaker. The contents of the beaker were stirred well and 450 mL of methanol was introduced while stirring. The contents of the beaker were stirred for about 15 minutes and transferred into a 2 L separatory funnel. Layer separation occured after a few hours and the bottom clear layer was rotary evaporated to recover the fractionated siloxane matrix polymer. It is recommended that the rotary evaporation temperature be not more than 70° C. Yield after rotary evaporation was 75.2 g.

The matrix polymer was then put through a short path distillation unit (provided by UIC, Joliet, Ill.). The conditions of the short path distillation unit were: 100° C., 2 mTorr and 50 rpm (for the wiper rollers). The feed rate was about 60 g/hr.

The short path distilled matrix polymer had a viscosity of 35,540 cps and a RI of 1.4717. The number average molecular weight ("Mn") was 7970 and the polydispersity ("D") was 2.8.

In the above matrix polymer synthesis, if unpurified copodisilanol is used, then fractionation is recommended to be done two times. The total volume of methanol and ethanol used will be twice the amount of heptane by volume and the volume ratio of ethanol will be thrice that of methanol for each fractionation.

Example 2

Synthesis of Octyl Methacrylate ("OMA")/2-hydroxyethyl Methacrylate("HEMA") Copolymer:

Into a 3-necked 250 mL flask was transferred 17.85 g (0.090 mole) of OMA, 1.30 g (0.01 mole) of HEMA and 2 g of 1-hexanethiol. 20 mL of toluene was then added to the flask. The contents were mixed thoroughly with a magnetic bar and a suitable agitating device. Nitrogen was bubbled through the contents of the flask for about 10 minutes before the heating was started and the bubbling was continued until the end of the polymerization reaction. There was no noticeable exotherm. The flask was heated to 60° C. At this temperature 0.20 g of 2,2'-azobisisobutyronitrile ("AIBN") free radical initiator was introduced as a solution in 10 mL of toluene. The temperature was maintained at 60° C. for 18 hours and then the contents of the flask were refluxed for about two hours. The polymer was then recovered by rotary evaporation under reduced pressure at 100° C.

The polymer was put through the short path distillation unit at 200° C., 2 mTorr and 350 rpm of wiper rollers. The purified polymer yield was 14.39 g (75% of theoretical) and the polymer had an RI of 1.4738. The Mn was 1530 and D was 1.60.

Example 3

Synthesis of Lauryl Methacrylate ("LMA")/HEMA Copolymer

Into a 3-necked 250 mL flask was transferred 24.42 g (0.096 mole) of LMA, 0.52 g (0.004 mole) of HEMA and 2 g of 1-hexanethiol. 20 mL of toluene was added to the flask. The contents were mixed thoroughly with a magnetic bar and a suitable agitating device. Nitrogen was bubbled through the contents of the flask for about 10 minutes before the heating was started and the bubbling was continued until the end of the polymerization reaction. There was no noticeable exotherm. The flask was heated to 60° C. At this temperature 0.20 g of AIBN free radical initiator was introduced as a solution in 10 mL of toluene. The temperature was maintained at 60° C. for 21 hours and then the contents of the flask were refluxed for about three hours. The polymer was then recovered by rotary evaporation under reduced pressure at 100° C.

The polymer was put through the short path distillation unit at 200° C., 2 mTorr and 350 rpm of wiper rollers. The purified polymer yield was 20.24 g (80% of theoretical). The polymer had a RI of 1.4722, the Mn was 2400 and D was 1.57.

Example 4

Synthesis of n-hexyl Methacrylate("HMA")/HEMA Copolymer

Into a 3-necked 250 mL flask was transferred 32.36 g (0.19 mole) of HMA, 1.30 g (0.01 mole) of 2-hydroxyethyl (meth)acrylate and 2.5 g of 1-hexanethiol. 40 mL of toluene was added to the flask. The contents were mixed thoroughly with a magnetic bar and a suitable agitating device. Nitrogen was bubbled through the contents of the flask for about 10 minutes before the heating was started and the bubbling was continued until the end of the polymerization reaction. There was no noticeable exotherm. The flask was heated to 60° C. At this temperature 0.15 g of AIBN free radical initiator was introduced as a solution in 10 mL of toluene. The temperature was maintained at 60° C. for 60 hours and then the reaction mixture was cooled down to room temperature. The polymer was recovered by rotary evaporation under reduced pressure at 100° C.

The polymer was put through the short path distillation unit at 200° C., 2 mTorr and 350 rpm of wiper rollers. The purified polymer yield was 22.4 g (69% of theoretical). The polymer had a RI of 1.4750, the Mn was about 1700 and D was 1.62.

Preparation of SPD Films with Polymeric Materials Having a Refractive Index of about 1.471.

Example 5

0.002 g of Irgacure 819 (Ciba Specialty Chemicals) photoinitiator ("PI") was dissolved in 2 mL of chloroform and added to 1 g of the matrix polymer described in Example 1. The PI solution was thoroughly mixed with the matrix polymer and the solvent chloroform was removed by placing the mixture inside of a vacuum oven for 30 minutes at 60° C. To this was added 0.62 g of polyiodide crystal paste containing the lauryl methacrylate/HEMA suspending polymer (0.56 g, as synthesized in example 3). The resulting mixture was thoroughly mixed and the emulsion obtained was applied onto a conductive coated polyester substrate as a 2 mil thick coating using a doctor blade, mated with a blank conductive coated polyester substrate and cured with ultraviolet radiation (8600 mJ/cm$^2$/min) for 2 min and 30 seconds.

Example 6

0.002 g of Irgacure 819 (Ciba Specialty Chemicals) photoinitiator was dissolved in 2 mL of chloroform and added to 1 g of the matrix polymer described in Example 1. The PI solution was thoroughly mixed with the matrix polymer and the solvent chloroform was removed by placing the mixture inside of a vacuum oven for 30 minutes at 60°

C. To this was added 0.62 g of polyiodide crystal paste containing the octyl methacrylate/HEMA suspending polymer (0.56 g, as synthesized in example 2). The resulting mixture was thoroughly mixed and the emulsion obtained was applied onto a conductive coated polyester substrate as a 2 mil thick coating using a doctor blade, mated with a blank conductive coated polyester substrate and cured with ultraviolet radiation (8600 mJ/cm$^2$/min) for 2 min and 30 seconds.

Example 7

0.002 g of Irgacure 819 (Ciba Specialty Chemicals) photoinitiator was dissolved in 2 mL of chloroform and added to 1 g of the matrix polymer described in Example 1. The PI solution was thoroughly mixed with the matrix polymer and the solvent chloroform was removed by placing the mixture inside of a vacuum oven for 30 minutes at 60° C. To this was added 0.62 g of polyiodide crystal paste containing hexyl methacrylate/HEMA suspending polymer (0.18 g, as synthesized in example 4), butoxycarbonylmethyl butyl phthalate (0.27 g) ("BPBG") and dimethyl malonate (0.07 g) ("DMM"). The resulting mixture was thoroughly mixed and the resulting emulsion was applied onto a conductive coated polyester substrate as a 2 mil thick coating using a doctor blade, mated with a blank conductive coated polyester film as the case may be and cured with ultraviolet radiation (8600 mJ/cm$^2$/min) for 2 min and 30 seconds.

Example 8

0.002 g of Irgacure 819 (Ciba Specialty Chemicals) photoinitiator was dissolved in 2 mL of chloroform and added to 1 g of the matrix polymer described in Example 1. The PI solution was thoroughly mixed with the matrix polymer and the solvent chloroform was removed by placing the mixture inside of a vacuum oven for 30 minutes at 60° C. To this was added 0.62 g of polyiodide crystal paste containing hexyl methacrylate/HEMA suspending polymer (0.28 g, as synthesized in example 4), butoxycarbonylmethyl butyl phthalate (0.24 g, "BPBG") and dimethyl tetrafluorosuccinate (0.04 g). The resulting mixture was thoroughly mixed and the resulting emulsion was applied onto a conductive coated polyester as a 2 mil thick film using a doctor blade, mated with a blank conductive coated polyester film as the case may be and cured with ultraviolet radiation (8600 mJ/cm$^2$/min) for 2 min and 30 seconds.

Samples of the above-cured films were loaded into an Atlas Ci 4000 Weather-Ometer after protecting them with filters on either side that cut off UV wavelengths almost completely below 400 nm. After exposure to Society of Automotive Engineers ("SAE") Standard kJ-1960 weathering conditions (excluding the humidity portion of the test), the samples were loaded in a Gardner color sphere (supplied by BYK Gardner, Columbia, Md.) for light transmission measurement before and after application of voltage. In the following table, "$T_{off}$" refers to the light transmission value before the application of voltage and "$T_{on}$" refers to the light transmission value after application of 50 v at 400 Hz of frequency. The "$\Delta T$" value refers to the difference between "on" and "off" state transmittance values. The "$\Delta E$" value refers to the difference in the transmittance values and any color change in time "T(hours)" in either the "off" or "on" state compared to the zero time value. The lower the $\Delta E$ values the better the performance of the film under the conditions of the test. It is clear from the values given in the following table that films made with 1.4717 RI matrix have performed significantly better in weatherability tests.

Weatherability Data with SAE kJ1960

| Formulation | Time (hrs) | $T_{off}$ (%) | $T_{on}$ (%) | $\Delta T$ | $\Delta E_{Off}$ | $\Delta E_{ON}$ |
|---|---|---|---|---|---|---|
| 1.4587 RI matrix and prior art (meth)acrylate + TETM/ELO Suspending Medium + polyiodide crystals | 0 | 21.68 | 62.97 | 41.29 | — | — |
|  | 179 | 24.77 | 60.84 | 36.07 | 3.48 | 1.81 |
| 1.4717 RI Matrix and LMA/HEMA + polyiodide crystals | 0 | 26.0 | 56.14 | 30.11 | — | — |
|  | 439 | 27.68 | 52.71 | 25.03 | 1.73 | 2.58 |
| 1.4717 RI Matix and OMA/ HEMA + polyiodide crystals | 0 | 5.14 | 53.58 | 48.44 | — | — |
|  | 893 | 5.61 | 52.38 | 46.77 | 2.13 | 0.85 |
| 1.4717 RI matrix, HMA/ HEMA And BPBG/DMM Suspending Liquid measure + polyiodide crystals | 0 | 3.87 | 38.00 | 34.13 | — | — |
|  | 1110 | 3.31 | 41.77 | 38.46 | 3.8* | 2.78* |

TETM => Triethyl Trimellitate
ELO => Epoxidized linseed oil
BPBG => Butoxycarbonylmethyl butyl phthalate
DMM => Dimethyl malonate
* => refers to darkening of the "off" and increase of "on" state light transmittances. These changes are actually improvements. Hence, the data is favorable.

What is claimed is:

1. A film suitable for use as a light-modulating unit of a suspended particle device (SPD) light valve, said film comprising a matrix polymer material and having droplets of a liquid light valve suspension distributed within the matrix, wherein said matrix polymer material is siloxane-based and has a refractive index (RI) of >1.4630.

2. The film according to claim 1, wherein the matrix polymer material is cross-linked in forming said film to produce a cross-linked polymer matrix.

3. A film suitable for use as a light-modulating unit of a suspended particle device (SPD) light valve, said film comprising a matrix polymer material, which matrix polymer material has an RI of >1.4630 and is cross-linked in forming said film to produce a cross-linked polymer matrix, and having droplets of a liquid light valve suspension medium distributed within the cross-linked matrix, wherein said liquid light valve suspension medium comprises a polyalkyl (meth)acrylate and/or fluorinated (meth)acrylate suspending polymer.

4. The film according to claim 2 or 3, wherein the matrix polymer material further comprises a photoinitiator to facilitate curing of said film by ultraviolet radiation.

5. The film according to claim 4, wherein the photoinitiator is selected from the group consisting of alphahydroxyketones and their blends, alphaamino-ketones, benzyldimethyl-ketals, acylphosphine oxides and their blends, metallocenes, benzoylformate esters, benzoin ethers, benzophenones and mixtures thereof.

6. The film according to claim 1 or 3 wherein the polymer matrix comprises a siloxane matrix polymer which is substantially immiscible with the liquid light valve suspending medium.

7. The film according to claim 6, wherein the siloxane matrix polymer has a refractive index in the range 1.4700 to 1.4750.

8. The film according to claim 7, wherein the siloxane matrix polymer has a refractive index of 1.4717.

9. A light valve comprising a pair of opposed spaced-apart cell walls, and a light modulating element between said cell walls, wherein said light modulating unit comprises the film according to claim 1 or claim 3.

10. An electro-optical device for controlling the transmission of radiation, said device comprising a cell formed of opposed cell walls, a light modulating element between said cell walls, and opposed electrode means operatively associated with said cell walls, said light modulating element comprising a film, said film comprising a siloxane matrix polymer of >1.4630 RI and having droplets of a liquid light valve suspension distributed within the matrix, said electrode means adapted for applying an electrical field across said suspension, wherein said liquid light valve suspension comprises a polymer selected from the group consisting of a polyalkyl (meth)acrylate polymer, a fluorinated (meth) acrylate polymer and mixtures thereof.

11. The electro-optical device according to claim 10, wherein said matrix polymer material is cross-linked in forming said film to produce a cross-linked polymer matrix.

12. The electro-optical device according to claim 10 or 11 wherein the polymer matrix comprises a siloxane matrix of >1.4630 RI which is substantially immiscible with the liquid light valve suspending medium.

13. The electro-optical device according to claim 12, wherein the siloxane matrix polymer has a refractive index in the range of 1.4700 to 1.4750.

14. The electro-optical device according to claim 13, wherein the siloxane matrix polymer has a refractive index of 1.4717.

15. The electro-optical device according to claim 12, wherein the matrix polymer material further comprises a photoinitiator to facilitate curing of said film by ultraviolet radiation.

16. The electro-optical device according to claim 15, wherein the photoinitiator is selected from the group consisting of alphahydroxyketones and their blends, alphaamino-ketones, benzldimethyl-ketals, acylphosphine oxides and their blends, metalocenes, benzoylformate esters, benzoin ethers, benzophenones and mixtures thereof.

17. A method of preparing a film suitable for use as a light-modulating unit of a suspended particle device light valve, the method comprising:

preparing a quantity of a siloxane matrix polymer material;

forming an emulsion from the combination of at least a portion of the siloxane matrix polymer material of >1.4630 RI and a quantity of a liquid light valve suspension, said suspension comprising a plurality of particles suspended in a liquid light valve suspending medium, wherein the liquid light valve suspension comprises a polyalkyl (meth)acrylate, a fluoro (meth) acrylate suspending polymer or a mixture thereof; and cross-linking the polymer matrix to substantially solidify the matrix polymer and produce a film having droplets of the liquid light valve suspension distributed in the cross-linked polymer matrix.

18. The method according to claim 17, wherein the polymer matrix is cross-linked by exposing said matrix polymer emulsion to a sufficient amount of heat or radiation for a sufficient duration to at least substantially convert said emulsion to a film.

19. The method according to claim 18, where said radiation is electron beam radiation or ultraviolet radiation.

20. The method according to claim 19, wherein said polymer matrix is cross-linked by exposure to ultraviolet radiation and wherein the method further comprises adding a photonitiator to the emulsion to facilitate cross-linking of said polymer matrix.

21. The method according to claim 20, wherein the photoinitiator is selected from the group consisting of alphahydroxyketones and their blends, alphaamino-ketones, benzldimethyl-ketals, acylphosphine oxides and their blends, metalocenes, benzoylformate esters, benzoin ethers, benzophenones and mixtures thereof.

22. The method according to claim 18, where said heat cross-linking further comprises adding a free radical initiator to the emulsion to facilitate cross-linking of said polymer matrix.

* * * * *